(12) United States Patent
Watanabe et al.

(10) Patent No.: US 9,506,406 B2
(45) Date of Patent: Nov. 29, 2016

(54) THROTTLE CONTROL DEVICE

(75) Inventors: Takeshi Watanabe, Tokorozawa (JP); Takashi Ohniwa, Higashiyamato (JP)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/412,569

(22) PCT Filed: Jul. 4, 2012

(86) PCT No.: PCT/SE2012/050777
§ 371 (c)(1),
(2), (4) Date: Jan. 2, 2015

(87) PCT Pub. No.: WO2014/007698
PCT Pub. Date: Jan. 9, 2014

(65) Prior Publication Data
US 2015/0135884 A1    May 21, 2015

(51) Int. Cl.
*F02D 11/04* (2006.01)
*A01D 34/90* (2006.01)
*F02N 3/02* (2006.01)
*F02B 63/02* (2006.01)

(52) U.S. Cl.
CPC .............. *F02D 11/04* (2013.01); *A01D 34/90* (2013.01); *F02N 3/02* (2013.01); *A01D 2034/907* (2013.01); *F02B 63/02* (2013.01); *Y10T 74/20438* (2015.01)

(58) Field of Classification Search
CPC ............ F02D 11/04; F02N 3/02; F16C 1/10; A01D 34/90; A01D 34/907; F02B 63/02; Y10T 74/2045; Y10T 74/20456
See application file for complete search history.

(56) References Cited

U.S. PATENT DOCUMENTS

| 2,480,083 A | 8/1949 | McMillan |
| 2,602,179 A | 7/1952 | Henri |
| 3,386,310 A * | 6/1968 | Haddad ..................... F16C 1/10 |
| | | 74/489 |

(Continued)

FOREIGN PATENT DOCUMENTS

| GB | 365583 A | 1/1932 |
| JP | 3264738 A | 11/1991 |

OTHER PUBLICATIONS

International Search Report and Written Opinion of PCT/SE2012/050777 mailed on Mar. 20, 2013.

(Continued)

*Primary Examiner* — Thomas Diaz
(74) *Attorney, Agent, or Firm* — Nelson Mullins Riley & Scarborough LLP

(57) ABSTRACT

A throttle control device includes a throttle lever fixed to a throttle shaft which is arranged to open or close a valve of a carburetor, an elastically deformable tube having a first end connected to a connection point on the throttle lever, the connection point being spaced from a rotating center of the throttle lever, and an intermediary section fixed at a first fixing position spaced from the connection point by a predetermined distance, and a throttle wire slidably accommodated in the tube and having a first end fixed at a second fixing position, the second fixing position being disposed outside the tube and at a distance from the first end of the tube, and a second end arranged to be manipulated by means of a throttle control lever so that the throttle wire moves relative to the tube, wherein the tube has a curved portion between the connection point and the first fixing position, the curvature radius of which changes due to the movement of the throttle wire relative to the tube.

15 Claims, 4 Drawing Sheets

(56) References Cited

U.S. PATENT DOCUMENTS

| | | |
|---|---|---|
| 3,472,096 A | 10/1969 | Krause |
| 4,633,724 A | 1/1987 | Mochida |
| 4,875,384 A | 10/1989 | Hirayama et al. |
| 6,223,622 B1 | 5/2001 | Ficyk et al. |
| 7,334,551 B2 * | 2/2008 | Pattullo .................. F02D 11/02 123/179.18 |
| 2001/0019118 A1 | 9/2001 | Kottke et al. |

OTHER PUBLICATIONS

Chapter I of the International Preliminary Report on Patentability of PCT/SE2012/050777 issued on Jan. 6, 2015.

* cited by examiner

THROTTLE CONTROL DEVICE

TECHNICAL FIELD

The present invention relates to a throttle control device used to prevent unintended pulling of a throttle wire arranged to rotate a throttle lever of a carburetor. The throttle control device may be applied to a power tool, such as a brush cutter, which cuts grass, branches or the like, and in which power is transmitted from an engine via a transmission shaft enclosed in a guide tube to a cutting blade.

BACKGROUND ART

Conventionally, in a portable brush cutter such as a shoulder-type brush cutter or a backpack-type brush cutter, a throttle control device is provided.

The throttle control device includes a throttle lever connected to a throttle shaft of the carburetor, and a throttle wire having a terminal portion connected to the throttle lever and manipulated by a throttle control lever. When an operator manipulates (pulling or relaxing) the throttle control lever, the throttle shaft of the carburetor is manipulated through the throttle wire and the throttle lever. Accordingly, a throttle valve of the carburetor which controls the air-fuel intake volume to a combustion chamber of the engine is opened or closed and the output of the engine is adjusted.

Further, in order to protect the throttle wire, the throttle wire is enclosed by a tube or the like so that an external force is not directly applied thereto. The following Patent Documents 1 to 6 disclose arrangements where such a throttle wire is accommodated in a tube.

CITATION LIST

Patent Document

[Patent Document 1] U.S. Pat. No. 4,875,384
[Patent Document 2] U.S. Pat. No. 2,480,083
[Patent Document 3] U.S. Pat. No. 4,633,724
[Patent Document 4] U.S. Pat. No. 6,223,622B1
[Patent Document 5] U.S. Pat. No. 3,472,096
[Patent Document 6] U.S. Pat. No. 2,602,179

SUMMARY OF INVENTION

Technical Problem

In the throttle control device, the throttle wire is inserted into the tube so that an external force is not directly applied thereto, as disclosed in each patent document. However, in the conventional portable brush cutter, the guide path for the throttle wire extending from the throttle control lever to the engine is long. Therefore, if the tube protecting the throttle wire is folded somewhere along the path or an external force is applied thereto, the throttle wire may be pulled together with the tube, thereby opening the throttle valve, which may result in an unintended output change of the engine.

In order to prevent the described situation, the tube may be fixed to the crank case or the like to avoid unintentional pulling of the tube. However, this requires an additional member such as a double nut for fixing the tube, and this in turn increases costs and causes trouble in assembly.

The present invention is designed in consideration of the above, and an object of the present invention is to provide a throttle control device with a simple structure, which prevents unintended pulling of the throttle wire, caused by an external force applied thereto, without providing an additional member.

Solution to Problem

A throttle control device according to an aspect of the invention includes a throttle lever fixed to a throttle shaft which is arranged to open or close the valve of a carburetor; an elastically deformable tube having a first end connected to a connection point on the throttle lever, the connection point being spaced from a rotating center of the throttle lever, and an intermediary section fixed at a first fixing position spaced from the connection point by a predetermined distance; and a throttle wire slidably accommodated in the tube and having a first end fixed at a second fixing position, the second fixing position being disposed outside the tube and at a distance from the first end of the tube, and a second end arranged to be manipulated by means of a throttle control lever so that the throttle wire moves relative to the tube, wherein the tube has a curved portion between the connection point and the first fixing position, the curvature radius of which changes due to the movement of the throttle wire relative to the tube.

Advantageous Effects of Invention

When, for example, an operator pushes the throttle control lever, the throttle wire is pulled so that the radius of the curved portion widens (its radius increases), the first end (free end) of the tube located around the first end of the throttle wire relatively moves in a direction towards the second fixing position. Accordingly, the throttle lever rotates in one direction (for example, in the clockwise direction) and the throttle valve of the carburetor is opened.

In addition, when the operator releases the throttle control lever, the throttle wire is relaxed so that the radius of the curved portion narrows (its radius decreases), the first end (free end) of the tube located around the first end of the throttle wire relatively moves in a direction away from the second fixing point. Accordingly, the throttle lever rotates in the other direction (for example, in the counterclockwise direction) and the throttle valve of the carburetor is closed.

In this way, the tube transmits the throttle control lever operation for pulling or relaxing the throttle wire to the throttle lever. Accordingly, even if an external force is applied to the throttle wire and the tube (for example, in the vicinity of a grip near the throttle control lever) so that the entire tube is pulled, the first fixing position supporting the intermediary section of the tube at the first fixing position regulates the movement of the tube. As a result, unintended operation of the throttle valve of the carburetor by means of the throttle lever is prevented.

In addition, in the aspect of the present invention, it is possible to prevent both the tube and the throttle wire from moving due to an external force without installing an additional member. Therefore, it is possible to prevent unintended movement of the throttle lever by a simple structure.

In addition, since the inside of the curved portion is a dead space, by disposing an intake passage under the curved portion, the space is effectively used.

DESCRIPTION OF EMBODIMENTS

Figure 1:
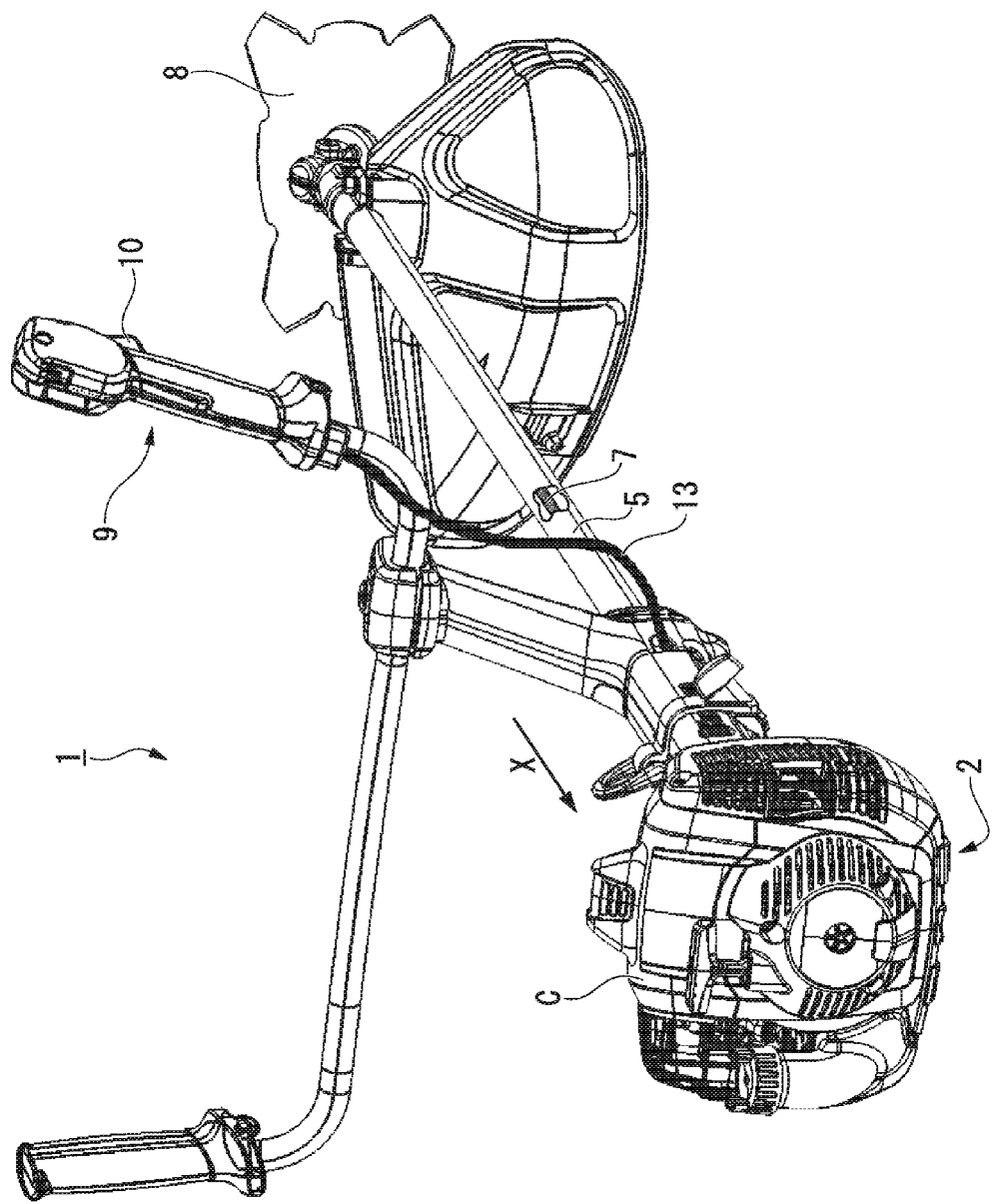
FIG. 1 is a perspective view showing a partial cross section of a portable brush cutter (a power tool) 1 according to an embodiment of the present invention.

An embodiment of the present invention will be described with reference to FIGS. 1 to 5. FIG. 1 is a perspective view showing a portable engine-driven brush cutter (a power tool) 1.

Figure 2:
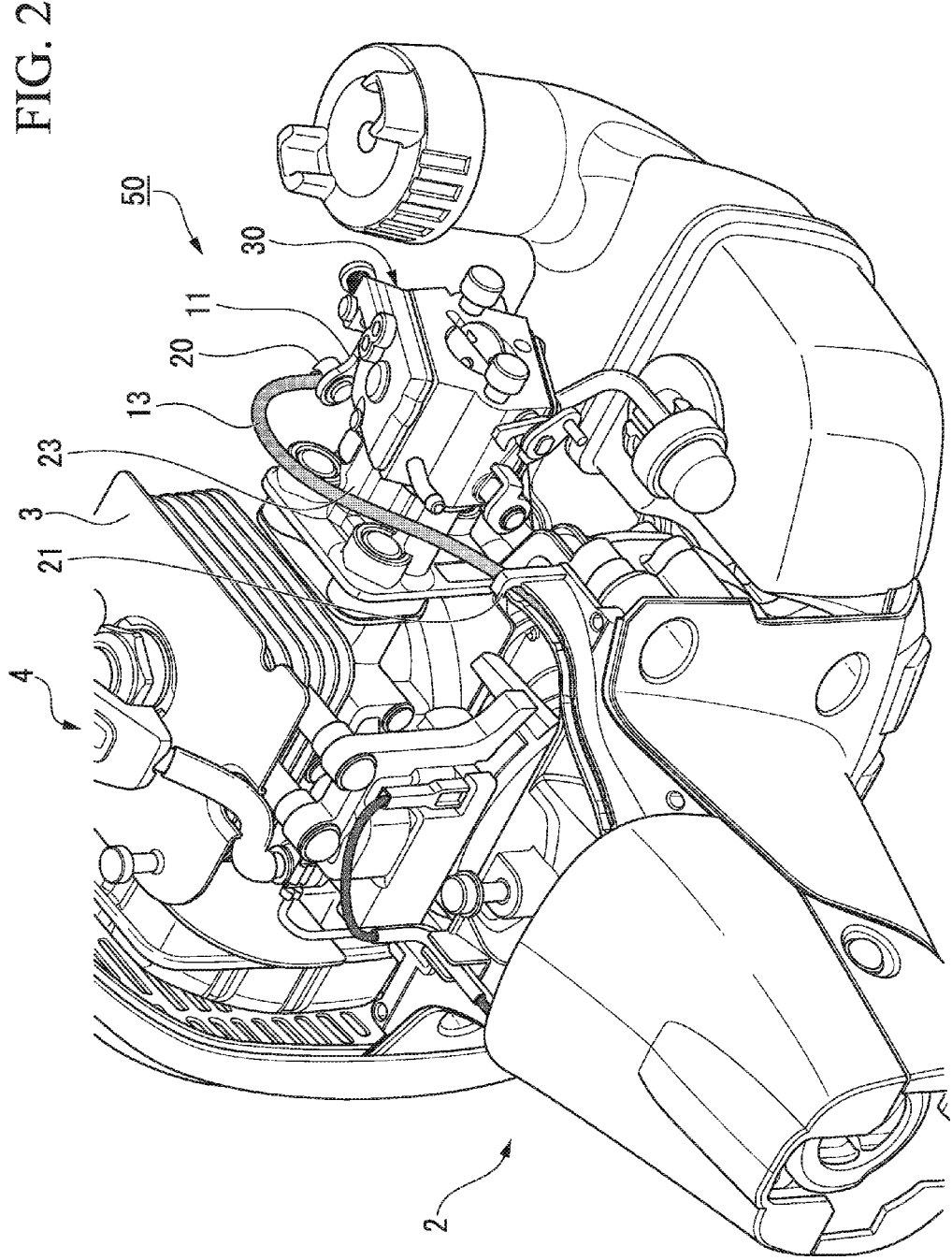
FIG. 2 is a perspective view showing a vicinity of an engine 4 of the portable brush cutter 1 of FIG. 1, observed from the direction of arrow X in FIG. 1.

As shown in FIGS. 1 and 2, the portable brush cutter 1 includes an engine 4 provided in a housing 2, a guide tube 5 straightly extending forward from the engine 4, and a cutting blade 8 provided at the front end of the guide tube 5.

Further, the power of the engine 4 is transmitted to the cutting blade 8 via a transmission shaft 7 accommodated in the guide tube 5 for rotation of the cutting blade 8.

In addition, a grip 9 for guidance of the brush cutter 1 is mounted to the guide tube 5. A throttle control lever 10 is provided on the grip 9.

Next, a throttle control device 50 according to an embodiment of the present invention will be described with reference to FIGS. 2 to 5. In FIG. 2, an air-cleaner 40 is omitted for a better view of the throttle control device 50.

Figure 3:
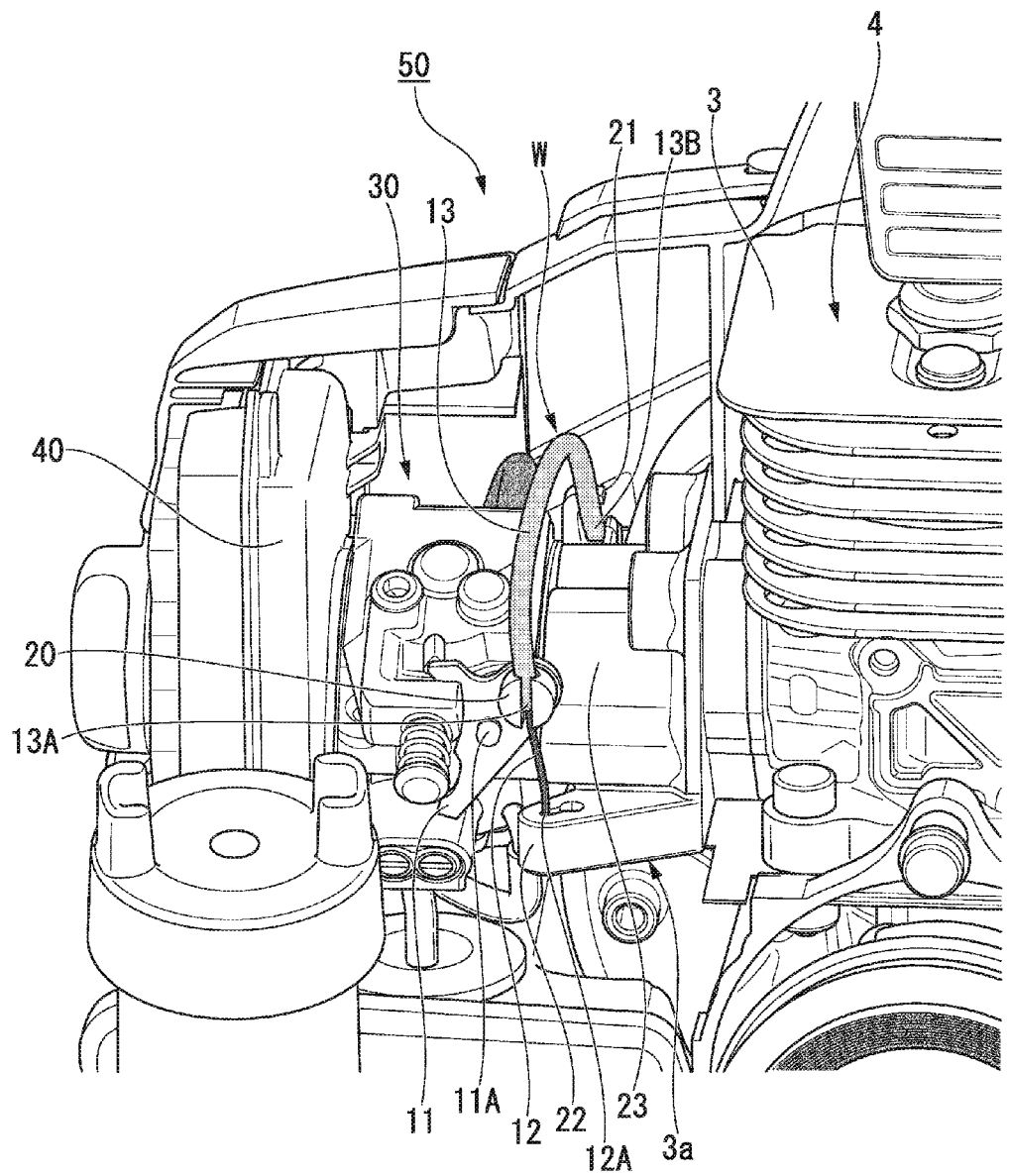
FIG. 3 is a perspective view of the throttle control device 50 according to an embodiment of the present invention.

As shown in FIGS. 2 and 3, the throttle control device 50 includes a throttle lever 11 connected to a throttle shaft 11A arranged to rotate a throttle valve (not shown) provided inside a carburetor 30 for adjusting the air-fuel-intake volume to the engine 4. The throttle lever 11 and the throttle shaft 11A are arranged to rotate around the same axis. The throttle control device 50 further includes a throttle wire 12 extending through an elastically deformable tube 13. A terminal of the throttle wire 12 is connected to the throttle control lever 10 (see FIG. 1). When in use, the throttle control device 50 is covered by a detachable protecting cover C (see FIG. 1) which protects the throttle control device 50 together with the housing 2. Therefore the throttle control device 50 is invisible from outside. FIGS. 2 and 3 show when the cover C is detached while FIG. 1 shows when the cover C is attached.

Figure 4:
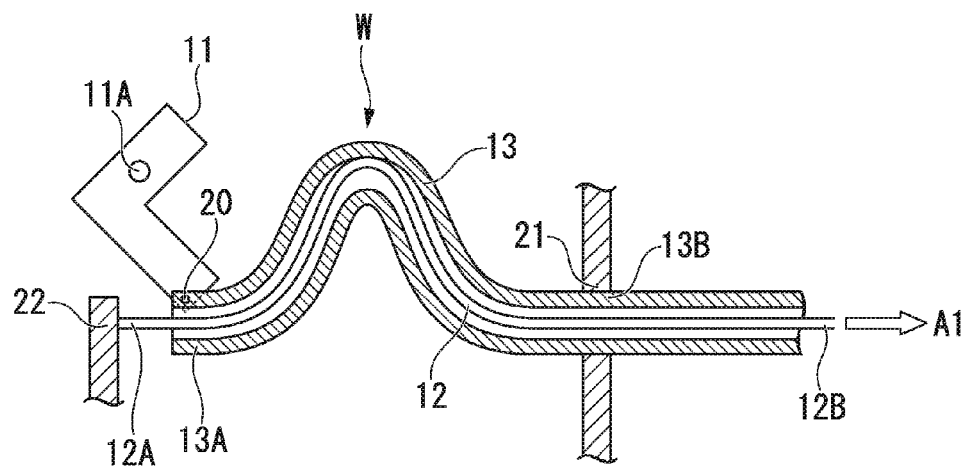
FIG. 4 is a schematic diagram for illustrating operations of a throttle control device 50.
Figure 5:
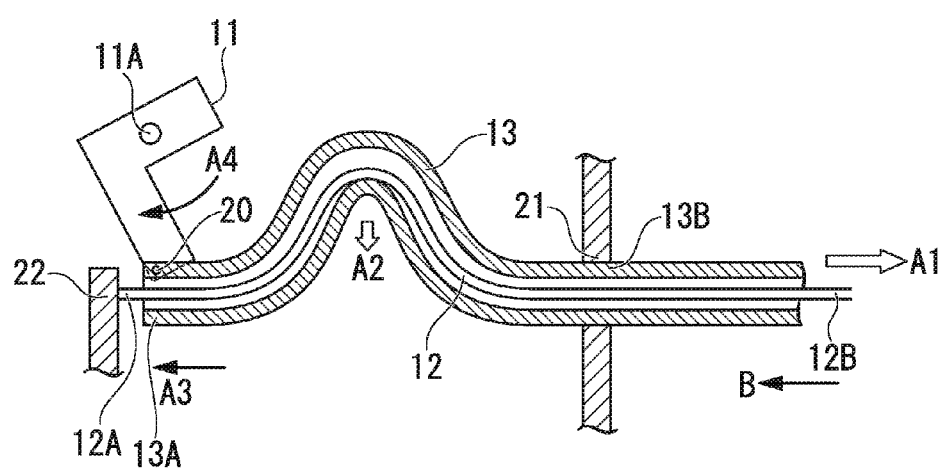
FIG. 5 is a schematic diagram for illustrating operations of the throttle control device 50.

As shown in FIGS. 4 and 5, a first end 13A of the tube 13 is rotatably connected to a connection point 20 located at a one end of the throttle lever 11 spaced from the rotating center (throttle shaft) 11A of the throttle lever 11. An intermediary section 13B of the tube 13 is fixed at a first fixing position 21 on the housing 2 spaced from the connection point 20 by a predetermined distance.

The throttle wire 12 is slidable relative to the tube 13. A first end 12A of the throttle wire 12, which is at a distance from the first end 13A of the tube 13, is fixed at a second fixing position 22 located at one end of an insulator 3a connected to the engine 4, and a second end 12B of the throttle wire 12 is manipulated by means of the throttle control lever 10. Accordingly, the throttle wire 12 moves relative to the tube 13.

In addition, between the connection point 20 and the first fixing position 21, a curved portion W of the tube 13 is provided. The curvature radius of the curved portion W changes as the throttle wire 12 is moved relative to the tube 13.

The curved portion W is disposed in a space between an air-cleaner 40, a cylinder 3 of the engine 4, and a cover C covering the engine 4 as shown in FIGS. 2 and 3. Further, the curved portion W is disposed over an intake passage 23 extending from the insulator 3a to the combustion chamber (not shown) of the engine 4. The first end 12A of the throttle wire 12 is fixed at the second fixing position 22 at one side of the intake passage 23 and the intermediary section 13B of the tube 13 is fixed at the first fixing position 21 at an opposite side of the intake passage 23.

In addition, the tube 13 with the throttle wire 12 inside passes through the first fixing position 21, extends along the guide tube 5, and then reaches the throttle control lever 10, as shown in FIG. 1.

When an operator manipulates (puling or relaxing) the throttle control lever 10, the throttle shaft 11A of the carburetor 30 is manipulated. Accordingly, the throttle valve of the carburetor 30 is opened or closed to adjust the output of the engine.

In detail, when the throttle wire 12 is pulled in the right direction A1 by manipulation of the throttle control lever 10 as shown in FIG. 4 so that the radius of the curved portion W increases, the first end 13A (free end) located around the first end 12A of the throttle wire 12 is pushed by the throttle wire 12 and relatively moves in a direction towards the second fixing position 22 (moves in the arrow A3 direction) as shown in FIG. 5. Accordingly, the throttle lever 11 rotates in one direction (in the clockwise direction A4) so that the throttle valve of the carburetor 30 is opened.

In addition, when the throttle wire 12 is relaxed in the left direction B by manipulation of the throttle control lever 10 as shown in FIG. 5 so that the radius of the curved portion W decreases, the first end 13A (free end) is pulled by the throttle wire 12 and relatively moves in a direction away from the second fixing position 22 (moves in a direction opposite to A3) as shown in FIG. 4. Accordingly, the throttle lever 11 rotates in the other direction (in the counterclockwise direction) so that the throttle valve of the carburetor 30 is closed.

In other words, in the throttle control device 50, the throttle control lever 10 operation for pulling or relaxing the throttle wire 12 is transmitted to the throttle lever 11 via the tube 13 having the intermediary section 13B which is fixed and supported at the first fixing position 21 of the housing 2. Therefore, even if an external force is applied to the throttle wire 12 and the tube 13 so that the entire tube 13 is pulled where they are exposed outside (for example, in the vicinity of the grip 9 near the throttle control lever 10), the first fixing position 21 supporting the intermediary section 13B becomes a regulating member, thereby preventing both the tube 13 and the throttle wire 12 from moving inside the housing 2. As a result, unintended operation of the throttle valve of the carburetor 30 is prevented.

In addition, in the throttle control device 50, it is possible to prevent both the tube 13 and the throttle wire 12 inside the housing 2 from moving due to an external force without newly installing an additional member for fixing the tube 13. Accordingly, it is possible to prevent unintended operation of the throttle lever 11 by a simple structure.

In addition, even though the curved portion W is disposed over the intake passage 23 in this embodiment, the disposing position is not limited thereto, and the curved portion W may be installed under the intake passage 23, for example.

In addition, the moving direction and rotating direction of members shown in the above embodiment are determined depending on the direction in which the figures are observed, and it is natural that the moving direction and rotating direction of the member vary if the observing direction is changed. Similarly, even though it has been illustrated in this embodiment that the throttle valve of the carburetor is opened by pulling the throttle wire 12 in the arrow A1 direction and the throttle valve of the carburetor 30 is closed by relaxing the throttle wire 12 in the arrow B direction, the opening and closing directions of the throttle valve may also be reversed.

In addition, even though the throttle control device 50 is applied to the portable brush cutter 1, the throttle control device 50 may also be applied to a small scale powered working machinery such as a power generator where the output of the engine 4 is adjusted through the throttle wire 12, but its application is not limited to the above.

As described above, the embodiments of the present invention have been described in detail with reference to the drawings, but the detailed configuration is not limited to the above embodiment but includes design changes or the like within a scope not departing from the gist of the invention.

INDUSTRIAL APPLICABILITY

According to the present invention, a throttle control device that prevents an unintended operation of a throttle wire by a simple structure is provided.

REFERENCE SIGNS LIST

1 portable bush cutter (power tool)
2 housing
3 cylinder
4 engine
8 cutting blade
10 throttle control lever
11 throttle lever
11A throttle shaft
12 throttle wire
12A first end
12B second end
13A first end
13B intermediary section
20 connection point
21 first fixing position
22 second fixing position
30 carburetor
40 air-cleaner
50 throttle control device
W curved portion
C cover

What is claimed is:

1. A throttle control device for a carburetor having a throttle valve for adjusting air-fuel intake volume to an engine of a power tool, the throttle control device comprising:
a throttle lever fixed to a throttle shaft of the carburetor which is arranged to open or close the throttle valve of the carburetor;
an elastically deformable tube having a first end connected to a connection point on the throttle lever, the connection point being spaced from a rotating center of the throttle lever, and an intermediary section fixed at a first fixing position, the first fixing position being disposed on a housing of the engine and spaced from the connection point by a predetermined distance; and
a throttle wire slidably accommodated in the tube and having a first end fixed at a second fixing position, the second fixing position being disposed outside the elastically deformable tube and at a distance from the first end of the tube, and a second end arranged to be manipulated by means of a throttle control lever so that the throttle wire moves relative to the tube,
wherein the elastically deformable tube has a curved portion between the connection point and the first fixing position, the curvature radius of which changes due to the movement of the throttle wire relative to the tube, and
wherein at least a portion of the elastically deformable tube disposed between the connection point and the first fixing position is covered by a detachable protecting cover of the power tool.

2. The throttle control device according to claim 1, wherein the curved portion is disposed over an intake passage of an insulator.

3. The throttle control device according to claim 1, wherein the first end of the throttle wire is fixed at one side of the intake passage and the intermediary section of the tube is fixed at an opposite side of the intake passage.

4. The throttle control device according to claim 1, wherein the curved portion is disposed under an intake passage of an insulator.

5. The throttle control device according to claim 2, wherein the first end of the throttle wire is fixed at one side of the intake passage and the intermediary section of the tube is fixed at an opposite side of the intake passage.

6. The throttle control device according to claim 1, wherein the power tool is a small scale powered working machinery where an output of the engine is adjusted through the throttle wire.

7. The throttle control device according to claim 6, wherein the small scale powered working machinery is one of a portable brush cutter and a power generator.

8. A small scale powered working machinery comprising an engine having a carburetor for adjusting air-fuel intake volume to the engine and a throttle control device, wherein the throttle control device comprises:
a throttle lever fixed to a throttle shaft of the carburetor which is arranged to open or close the throttle valve of the carburetor;
an elastically deformable tube having a first end connected to a connection point on the throttle lever, the connection point being spaced from a rotating center of the throttle lever, and an intermediary section fixed at a first fixing position, the first fixing position being disposed on a housing of the engine and spaced from the connection point by a predetermined distance; and
a throttle wire slidably accommodated in the tube and having a first end fixed at a second fixing position, the second fixing position being disposed outside the elastically deformable tube and at a distance from the first end of the tube, and a second end arranged to be manipulated by means of a throttle control lever so that the throttle wire moves relative to the tube,
wherein the elastically deformable tube has a curved portion between the connection point and the first fixing position, the curvature radius of which changes due to the movement of the throttle wire relative to the tube, and
wherein at least a portion of the elastically deformable tube disposed between the connection point and the first fixing position is covered by a detachable protecting cover of the small scale powered working machinery.

9. The small scale powered working machinery according to claim 8, wherein the curved portion is disposed over an intake passage of an insulator.

10. The small scale powered working machinery according to claim 9, wherein the first end of the throttle wire is fixed at one side of the intake passage and the intermediary section of the tube is fixed at an opposite side of the intake passage.

11. The small scale powered working machinery according to claim 8, wherein the first end of the throttle wire is fixed at one side of the intake passage and the intermediary section of the tube is fixed at an opposite side of the intake passage.

12. The small scale powered working machinery according to claim 8, wherein the curved portion is disposed under an intake passage of an insulator.

13. The small scale powered working machinery according to claim 8, wherein an output of the engine is adjusted through the throttle wire.

14. The small scale powered working machinery according to claim 13, wherein the throttle wire is connected to the throttle control lever provided on a grip of the small scale powered working machinery, and wherein the throttle control device is provided within said housing of the engine.

15. The small scale powered working machinery according to claim 8, wherein the small scale powered working machinery is one of a portable brush cutter and a power generator.

* * * * *